United States Patent [19]
Ide et al.

[11] Patent Number: 5,345,434
[45] Date of Patent: Sep. 6, 1994

[54] METHOD AND APPARATUS FOR CORRECTING EDGE INTERVAL OF RECORD SIGNAL IN AN OPTICAL RECORD/READ-OUT APPARATUS

[75] Inventors: Hiroshi Ide, Kodaira; Takeshi Maeda, Kokubunji, both of Japan

[73] Assignee: Hitachi, Ltd., Tokyo, Japan

[21] Appl. No.: 144,608

[22] Filed: Nov. 1, 1993

Related U.S. Application Data

[63] Continuation of Ser. No. 720,706, Jun. 25, 1991, abandoned.

[30] Foreign Application Priority Data

Jun. 29, 1990 [JP] Japan ................................ 2-170052

[51] Int. Cl.[5] ............................................. G11B 7/00
[52] U.S. Cl. ..................................... 369/124; 369/54; 369/58; 369/59
[58] Field of Search ................ 369/116, 124, 100, 109, 369/48, 49, 50, 51, 59, 111, 121, 32, 47, 54, 55, 57, 58, 60, 64; 346/76 L

[56] References Cited

U.S. PATENT DOCUMENTS

| | | | |
|---|---|---|---|
| 4,631,713 | 12/1986 | Romeas et al. | 369/116 |
| 4,855,988 | 8/1989 | Shinbayashi et al. | 369/116 |
| 4,858,219 | 8/1989 | Yoshikawa | 369/116 |
| 4,979,162 | 12/1990 | Kimoto et al. | 369/107 |
| 5,043,971 | 8/1991 | Van et al. | 369/116 |
| 5,072,435 | 12/1991 | Bakx | 369/116 |

FOREIGN PATENT DOCUMENTS

| | | |
|---|---|---|
| 59-197108 | 4/1986 | Japan . |
| 61-239441 | 10/1986 | Japan . |
| 62-54831 | 3/1987 | Japan ................................ 369/116 |
| 61-190442 | 3/1988 | Japan . |
| 63-304427 | 12/1988 | Japan . |

OTHER PUBLICATIONS

"Application of Pit Edge Recording on PbTeSe Thin Films"; Saito et al.; p. 4–176 of the Digest of the National Confer. on 70th Anniversary of the IECE of Japan.

*Primary Examiner*—Tommy P. Chin
*Assistant Examiner*—Thai Tran
*Attorney, Agent, or Firm*—Fay, Sharpe, Beall, Fagan, Minnich & McKee

[57] ABSTRACT

In a data recording operation, various patterns each having n edge widths (n is an integer), which are considered to appear in the operation, are predicted such that a record pattern sequence including the various patterns is recorded before an actual data recording operation. Using a read-out signal thereof, a shift quantity of each edge of the read-out signal with respect to an inherent edge record position is attained, thereby generating a table containing relationships between the respective patterns and the edge shift quantities. During an actual data recording operation, a record signal of the data is collated in a unit of the n edge widths with the patterns stored in the table so as to correct the edge width.

18 Claims, 14 Drawing Sheets

METHOD AND APPARATUS FOR CORRECTING EDGE INTERVAL OF RECORD SIGNAL IN AN OPTICAL RECORD/READ-OUT APPARATUS

This is a continuation application of Ser. No. 07/720,706, filed Jun. 25, 1991 now abandoned.

BACKGROUND OF THE INVENTION

The present invention relates to a method of and an apparatus for correcting an edge interval of record signals in an optical recording/read-out apparatus in which digital signals are recorded on a recording medium such as an optical disk and the recorded signals are read out therefrom, wherein an edge interval is corrected for record signals written in the recording medium based on a power of the record signals and a record pattern written thereon immediately therebefore.

An optical disk has been employed is a recording medium on which digital or digitized signals are written. In the recording operation, a laser beam is focused onto a recording surface of the optical disk such that the intensity of the focused light is varied in relation to information to be stored thereon.

In this connection, there has been used a pit edge recording method in which the laser power is modified for a recording operation on the disk so as to store information before and after the record mark, and hence two or more data items are recorded for a record mark, which efficiently develops a high-density recording operation.

According to the pit edge recording method, in general, when a laser utilized in the recording operation has low power, the contour of the record mark thus created is likely to be unstable. In addition, when the recording speed is altered, the amount of thermal energy applied to a unitary area and the thermal distribution are varied, thereby disadvantageously generating various shapes of the record marks. In consequence, actually, in order to create a stable or uniform shape of the record mark for the recording and read-out operations, according to the "Application of Pit Edge Recording on PbTbSe Thin Film" found on page 4-176 of the Digest of the National Conference on 70th Anniversary of Foundation of the IECE of Japan, the operation is accomplished, for example, by adjusting the laser pulse length as follows. Namely, the recording laser is produced with an intensity slightly higher than the usual intensity such that the laser pulse length is shortened in the recording operation to suppress the excessive portion of the mark length associated with the line speed of the laser; moreover, in the read-out operation, the pulse length is reduced in a signal having undergone binarization.

Moreover, in general, the contour of the recorded mark primarily depends on the recording sensitivity and the thermal conductivity of the recording medium, the laser beam intensity distribution of the laser beam used for the recording operation, the wavefront aberration leading to a state where the actual focal state cannot be developed even when the laser beam is focused, and the like. Consequently, when a combination of the recording apparatus and the recording medium varies, the characteristics of the recording and read-out operations are also changed. In addition, in the recording operation, the level of the laser power of the recording apparatus changes as the time lapses. Even if an automatic power control (APC) mechanism is disposed to automatically control the laser power, there cannot be avoided a laser power level deviation in a certain range. This factor also varies the recording and read-out characteristics, which leads to a change in the record mark length in the recording operation and to a variation in a pulse interval of read-out signals in the read-out operation.

In consequence, for the recording apparatus of which the correction value of the laser pulse length and the laser power are respectively set to fixed values before delivery thereof to the users, the design specifications are decided depending on values of recording and read-out characteristics measured by use of many combinations of various recording media and recording apparatuses. In this operation, in order to guarantee a high reliability of the detection in many situations in consideration of a range of deviation of the recording and read-out characteristics due to the various combinations above, the recording density is determined with a large margin. Namely, the decision of the specifications is conducted with a sacrifice of the recording density.

In order to overcome this difficulty, there has been proposed a method in which to absorb the deviation in the characteristics due to the combinations of the recording media and the recording apparatus so as to develop a high recording density, a test pattern is beforehand recorded on an optical disk such that the test pattern is read out therefrom to attain information based thereon for adjustment of the recording conditions. For example, in an apparatus described in JP-A-61-239441, the laser power of the recording operation is adjusted and fixed to one level; in a device described in JP-A-61-74178, an adjustment amount of the recording pulse width is adjusted and fixed to one amount independent of the recording pulse width; and in an apparatus described in JP-A-61-304427, the fixed laser power of the recording operation, the fixed adjustment value related to and independent of the recording pulse width, and the automatic equalization coefficient of the read-out operation are simultaneously adjusted.

Furthermore, the recording operation of the optical disk is fundamentally accomplished through a thermal diffusion. Consequently, owing to preceding and following series of recording pulses associated with a record mark, the thermal distribution is diffused to cause a phenomenon in which the contour of the record mark is varied (to be called a thermal interference herebelow). This phenomenon also leads to a variation in the pulse interval of the read-out signals in the read-out operation. Consequently, in order to conduct an appropriate correction in the recording operation, the influence of the thermal interference is required to be taken into consideration. To cope therewith, according to the recording method described in JP-A-63-48617, the width of the record signal is changed depending on an edge interval of the preceding record signal. This method, however, is attended with the following problem.

Namely, when it is desired to increase the recording density up to a level where the record mark contour and the interval between record marks are of a size similar to the size of a laser spot focused onto a surface of the recording film, the range where the influence of the thermal interference of the optical disk is exerted exceeds the minimum length of the record mark used. In other words, a series of laser pulses adopted for the previous recording operation excercise influence on the shift of the edge position of a record mark to be next recorded on the disk. Particularly, in a case of a recording medium which has a high recording sensitivity with respect to an intensity of a laser beam and on which the recording operation can be hence accomplished with low laser power, a high thermal conductivity is developed in general and the thermal interference related thereto exerts influence thereon in a large range.

Moreover, in the adjustment method conducted in association with the edge interval of a record signal, since information related to the adjustment amount is preset in advance, the adjustment amount cannot be modified depending on a variation on the recording characteristic taking place in the course of the recording and the reading operation. In consequence, an adjusting error appears in relation to the discrepancy between the preset recording characteristic and the changed recording characteristic, which disadvantageously leads to an inappropriate adjustment.

On the other hand, in the method of attaining recording condition adjusting information as described in the three articles above, each of the recording laser power and the recording pulse width has an adjustment quantity of a single value. Consequently, it is impossible to minimize the variation of the recording mark length due to the thermal interference of which the magnitude varies depending on various record patterns.

Heretofore, since the signal read-out of a reproducing system has a narrow frequency bandwidth, a pulse signal reproduced has an expanding skirt or base portion. In this situation, in order to reduce linear interference occurring between neighboring signals due to a superimposed portion thereof, a linear equalizer such as a transversal filter is used on the reproduction side, in general, in the field of communications, magnetic recording, etc.

However, the influence of the thermal diffusion appears in the read-out operation primarily in the form of a shift of the waveform along the direction of time. This is associated with a nonlinear interference component of an interference between codes, which cannot be simply expressed by use of a linear superimposition of fundamental waveforms related to the record information. In consequence, the component of the edge position variation due to the thermal interference occurring in the recording operation cannot be coped with by a linear equalizer. Namely, actually, it is quite difficult for the system on the read-out side to appropriately deal with the interference component in a real time manner.

Particularly, in a pit edge recording method achieving an opto-magnetic recording operation on a recording medium having a high thermal conductivity, the mark length is associated with a large shift component and hence it is required to take a large margin for the component. This inevitably necessitates the sacrifice of the recording density i.e. the higher recording density cannot be implemented.

SUMMARY OF THE INVENTION

It is therefore an object of the present invention to provide a method of and an apparatus for correcting an edge interval of record signals in an optical recording/-read-out apparatus wherein in a pit edge recording method, the laser power and pulse edge position are controlled to reduce the mark length variation due to influence of the thermal interference, thereby increasing the recording density, the signal transfer speed, and the recording and read-out reliability.

In order to achieve the object above, the edge intervals of record signals are corrected in the following manner.

When data are recorded on an optical disk, there are beforehand predicted various patterns which are considered to appear in the data recording operation later and which have n edge widths (n is an integer). A sequence of record patterns including various patterns above are recorded on the disk prior to the actual recording operation so as to determine a shift amount of an edge position of a read-out signal thereof with respect to an ideal edge position thereof. Based on the result, there is produced a table containing relationships between each of the patterns and an edge shift amount associated therewith.

In an actual data recording operation, a record signal of data is collated with the patterns associated with the n edge widths stored in the table for each pattern, thereby correcting the edge width.

The correction method will next be described in more detail.

(a) A first record pattern having a predetermined duty ratio is recorded on an optical disk with a preset laser power. The recorded pattern is then read out therefrom so as to compare the read-out signal with the record signal to obtain and to determine a pulse length difference between the corresponding pulses.

(b) When the check result indicates that the difference is beyond an allowable range, the laser power is varied in a stepwise manner to record the first record pattern so as to check again the pulse length difference between the read-out signal and the record signal.

(c) Based on the result of the check, there is determined a laser power associated with the record signal of which the pulse length difference is found to be within the allowance, thereby determining the laser power to be used in a data recording operation.

(d) With the laser power thus obtained, a second record pattern including a combination of a pulse and a gap respectively having various kinds of lengths is recorded N times (N is an integer).

(e) In the read-out signal of the second record pattern, the second record pattern is further classified into a third pattern comprising n consecutive pulses and gaps (n is an integer). For each of the third patterns, an ideal edge position associated with the record signal is compared with an edge position thereof to obtain a shift amount of the last edge of the third pattern.

(f) Relationships between the third patterns and the shift quantity of the last edge of each third pattern are loaded in a table, which is then stored in a memory.

(g) For a signal pattern which comprises n consecutive pulses and gaps and which has not been recognized as a third pattern, a relationship between the pattern and the shift amount of the last edge thereof is obtained through an interpolation with a measured value obtained from the third pattern and is then additionally loaded in the table.

(h) In an actual data recording operation, a record signal associated with the data is collated with patterns in the table in the unit of n patterns so as to determine a pattern matching with the record signal. For the obtained pattern, the last edge thereof is corrected depending on the data stored in the table.

FIG. 1 shows an example of the variation of a record mark due to thermal interference.

In this diagram, letters $f_i$ and $e_i$ stand for edge variations, respectively. When creating the table above, assuming that the third pattern comprises three pulses and a gap, the relationships are attained such that an edge shift quantity $e_i$ is produced for patterns $l_{i-1}$, $b_{i-1}$, and $l_i$; an edge shift quantity $f_{i+1}$ is created for patterns $b_{i-1}$, $l_i$, and $b_i$; and so on, thereby storing the attained results in the memory.

FIG. 2 shows an outline of the edge interval correction according to the present invention.

A record signal related to data to be recorded on the optical disk is collated with patterns loaded in the table such that edge intervals $l_1$, $b_1$, $l_2$, and $l_i$ are corrected to $l_1+E_1$, $b_1-E_1+F_2$, $l_2-E_2-F_2$, and $l_i-E_i+F_i$, respectively. In this case, the edge correction quantity $E_i$ for the edge interval $l_i$ is obtained by collating patterns $l_{i-1}-E_{i-1}+F_{i-1}$, $b_{i-1}-F_i+E_{i-1}$, and $l_i+F_i$ with the contents of the table.

When pits are recorded on the optical disk based on the record signal thus corrected, the edge positions of the read-out signal are substantially equal to the associated edge positions of the record signal before the correction.

According to the present invention, in the pit edge recording method, the edges of the record mark can be more appropriately controlled to achieve a high-density recording operation; moreover, it is possible to absorb, for example, the deviation of the record mark length due to the recording characteristic difference related to the variation of the combination of the recording media and the recording apparatus and the influence of the thermal interference associated with different record patterns.

Moreover, thanks to the utilization of a plurality of recording characteristics measured through recording and read-out operations in various areas on a recording medium, the record correction can also be accomplished in an area associated with the different line speed.

In addition, when the recording characteristics are measured each time when the recording apparatus starts its operation, when a recording medium is replaced, when a predetermined period of time is elapsed, and/or in association with a change in a temperature on the recording surface or in the recording optical beam power, it is also possible to absorb the variation with a lapse of time in the characteristics on the recording apparatus side.

DESCRIPTION OF THE PREFERRED EMBODIMENTS

Figure 1:
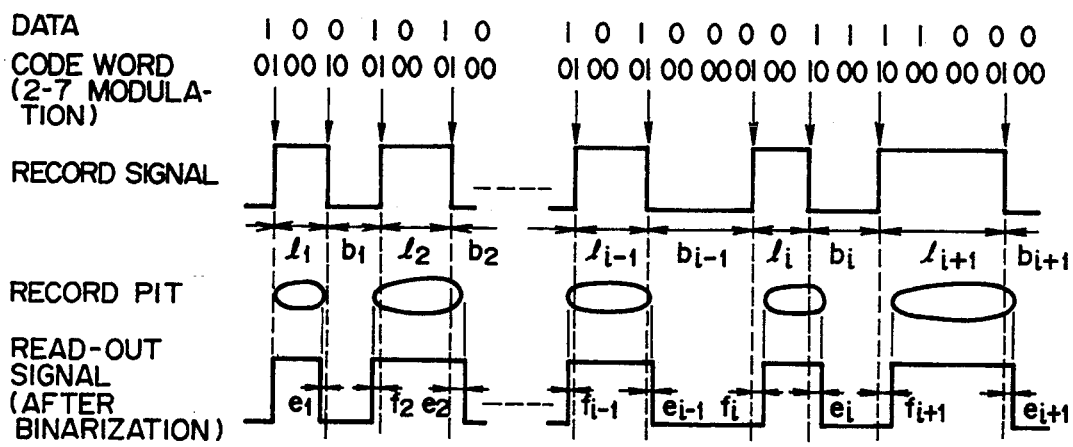
FIG. 1 is a schematic diagram showing a variation of record edges.
Figure 2:
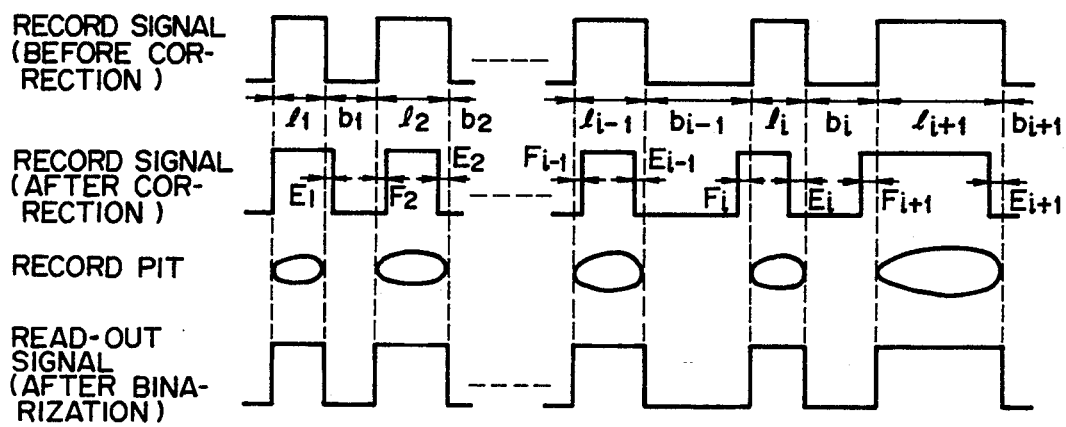
FIG. 2 is a diagram illustratively showing an outline of an edge interval correction according to the present invention.
Figure 3:
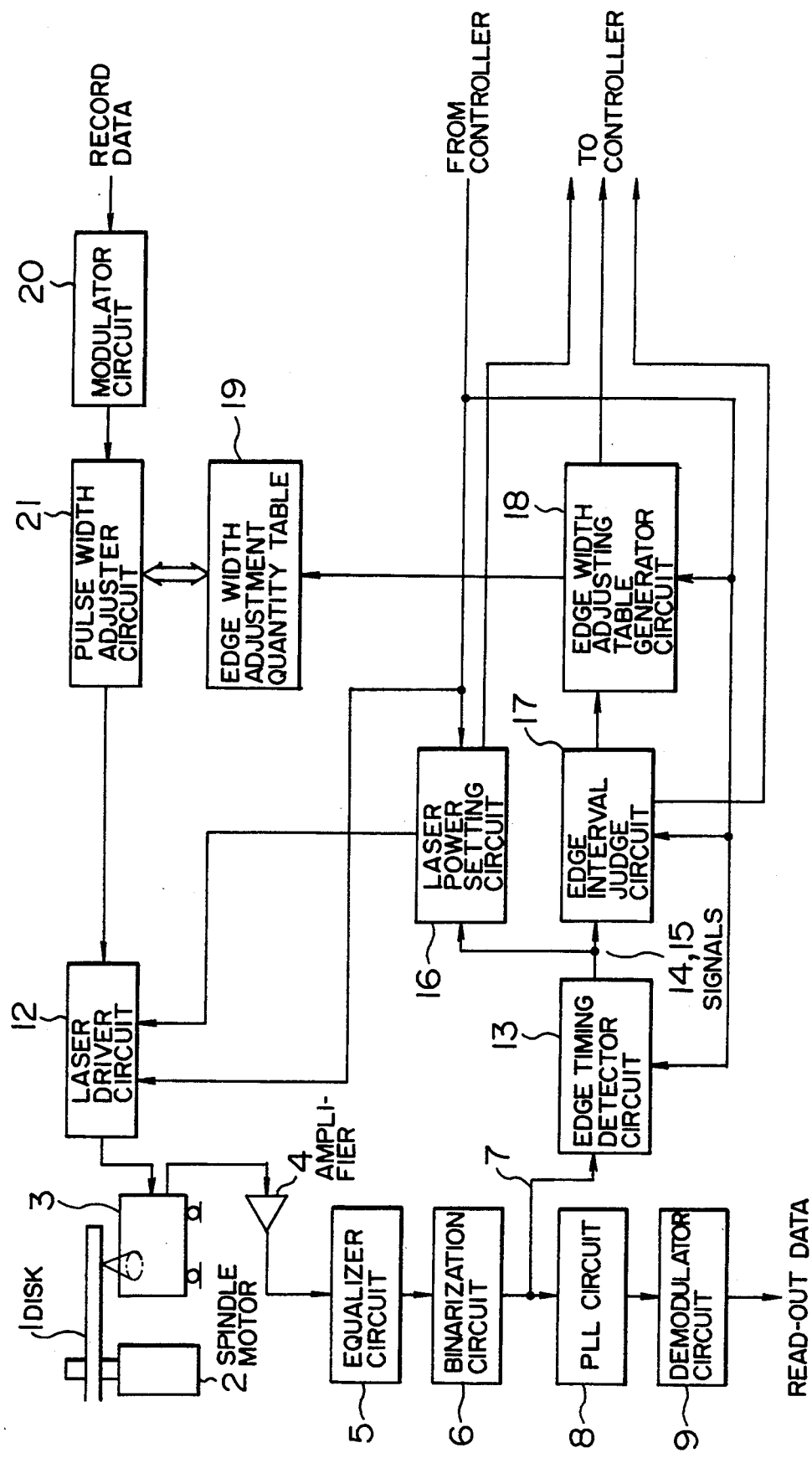
FIG. 3 is a block diagram showing an optical recording/read-out apparatus to which the present invention is applied.

FIG. 3 is a block diagram showing the constitution of an optical recording/read-out apparatus according to the present invention.

The system of FIG. 3 includes an optical disk 1, a spindle motor 2, an optical pickup 3, an amplifier 4, an equalizer circuit 5, a binarization circuit 6, a phase locked loop (PLL) circuit 8, a demodulator circuit 9, and a modulator circuit 20. The modulator circuit 20 may be of the same configuration and the same function as the associated component of the conventional optical disk device. Consequently, a redundant description thereof will be avoided.

Next, a description will be given of the operations of the blocks of FIG. 3 characteristic of the present invention.

An edge timing detection circuit 13 is used to detect each edge interval of a read-out signal.

An edge interval judge circuit 17 records N times (N is an integer) a predetermined record pattern comprising a combination of pulses of various kinds of lengths and gaps and processes a read-out signal reproduced from the recorded signal. This circuit measures an edge interval for each pulse and gap of which are detected every N pulses and gaps, and obtains mean values of the edge intervals.

An edge width adjusting table generator circuit 18 creates an edge width adjustment quantity table 19 containing relationships between short patterns each consisting of a combination of n pulses and gaps (n is an integer) and quantities of deviation of edge intervals associated with the patterns. For a pattern which has not been classified as the short pattern, an interpolation is conducted by use of measured data to determine a corresponding deviation quantity of the edge interval.

An edge width adjusting circuit 21 collates a pattern in each portion of a record signal generated in association with data to be recorded with patterns stored in the edge width adjusting table 19, thereby correcting the position of each edge based on the edge interval deviation quantity loaded in the table 19.

A laser power setting circuit 16 is adopted to detect an appropriate laser power to set the value thereof to a laser drive circuit 12.

The laser driver circuit 12 includes a laser power change function. Namely, this circuit 12 comprises a laser power setting circuit for an ordinary recording operation and develops a function to stepwise alter the laser power to attain an optimal laser power.

Next, a description will be given of the constitution and the operation in detail of the respective blocks.

Edge Timing Detection Circuit 13

Figure 4:
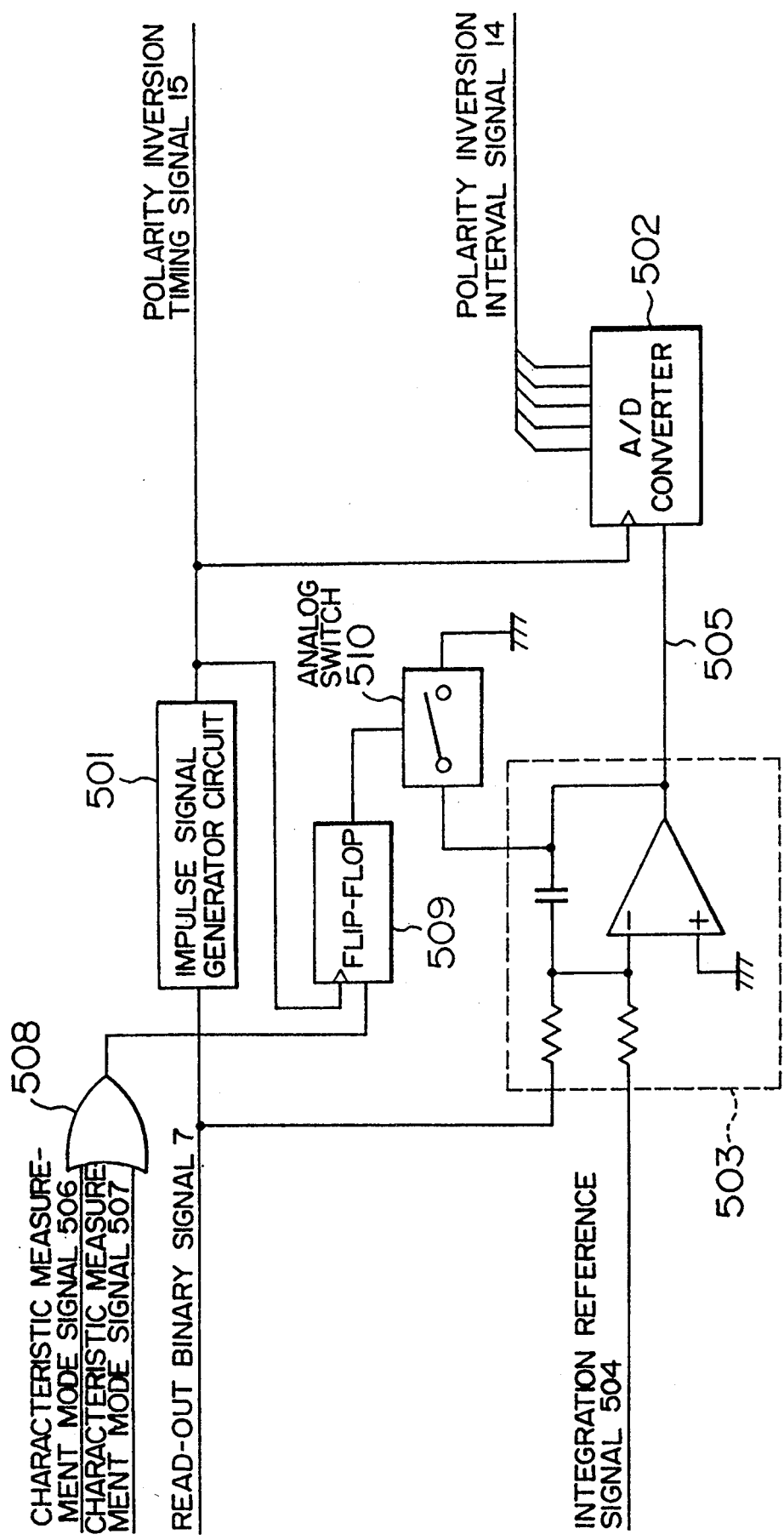
FIG. 4 is a circuit diagram showing in detail a timing detection circuit.
Figure 5:
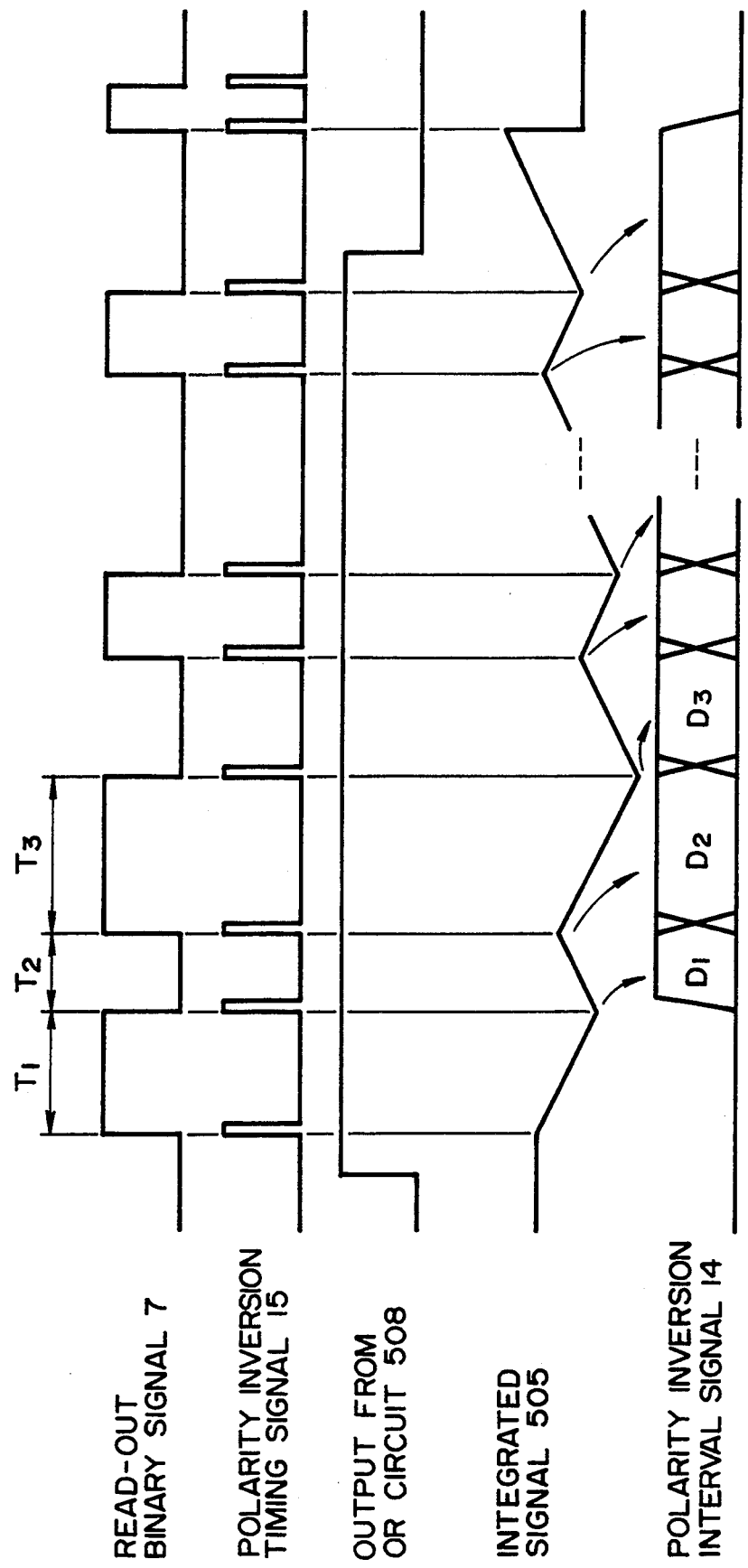
FIG. 5 is a graph showing waveforms developed in the timing detection circuit.

FIG. 4 shows the detailed circuit configuration of this circuit, whereas FIG. 5 shows waveforms of primary signals developed in this circuit.

The edge timing detection circuit 13 is disposed to process a binarized read-out signal 7 to detect a pulse length (a period of time from a rising portion of the signal to a falling portion thereof) and a gap length (a period of time from a falling portion of the signal to a rising portion thereof).

Basically, the read-out binary signal 7 is passed to an integrator circuit 503 comprising an amplifier to be transformed into an integrated signal 505, which is then converted by an analog-to-digital (A/D) converter 502 to be a polarity inversion interval signal 14 representing a digital quantity for an output to a subsequent circuit.

The integrated signal 505 represents a value associated with a quantity obtained by subtracting the total of the respective gap lengths from the total of the respective pulse lengths in a period of time from an initiation of the operation of the integrator 503 to the present point of time. Since, at each time when the polarity of the read-out binary signal 7 is inverted, a signal having an impulse-shaped waveform is inputted into the A/D converter 502 from an inpulse signal generator 501, the integrated signal 505 is converted into a digital signal at the timing above. As a result, for example, D1, D2, and D3 of the interval signal 14 (FIG. 5) respectively denote digital values associated with $-T1$, $-T1+T2$, and $-T1+T2-T3$ of the binary signal 7. In this connection, the impulse waveform is also used as a polarity inversion timing signal 15 in other circuits.

Finally, an OR circuit 508, a flip-flop 509, and an analog switch 510 are used to specify an operation period of time for the integrator circuit 503.

Laser Power Setting Circuit 16

Figure 6:
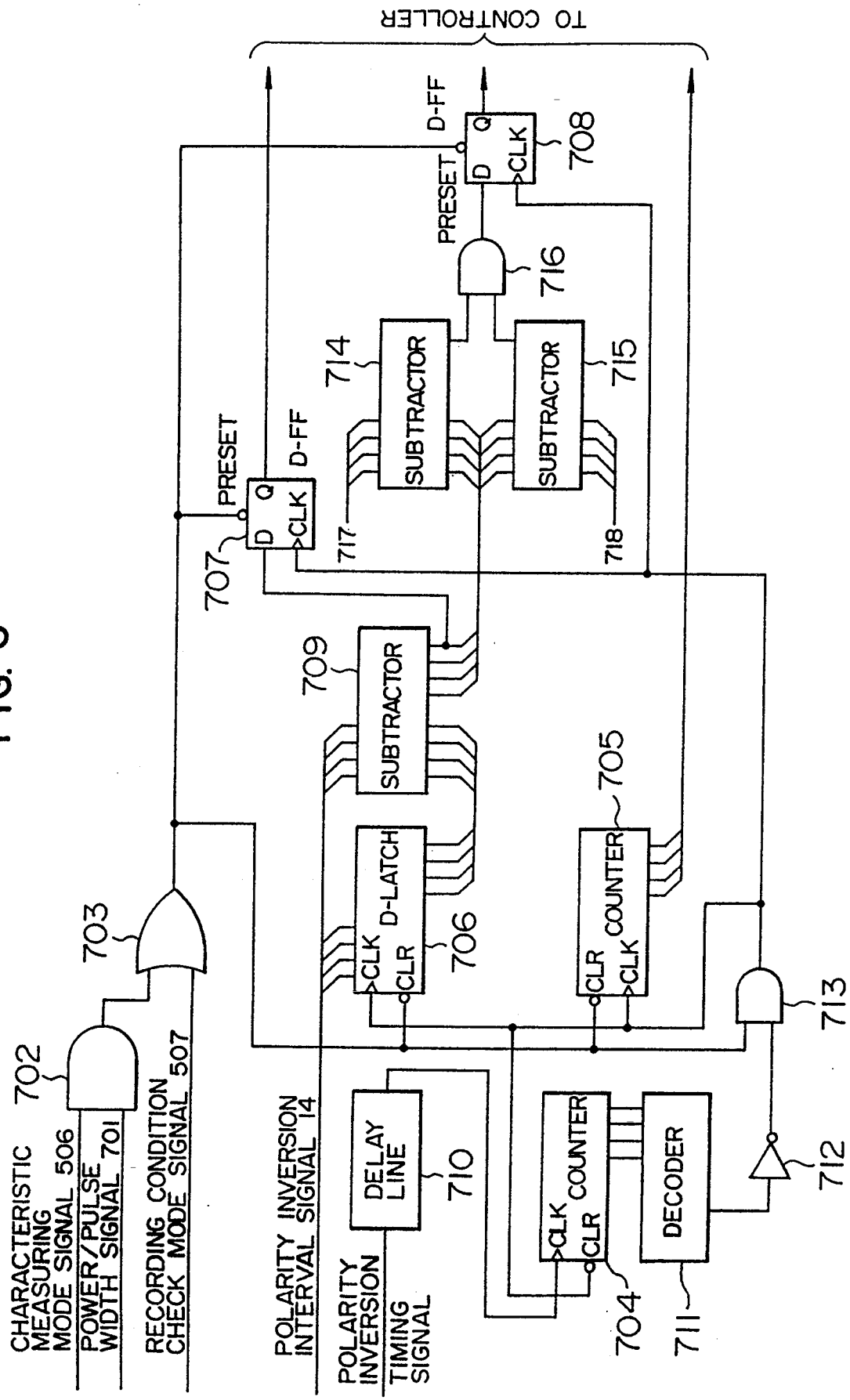
FIG. 6 is a detailed circuit diagram showing a laser power setting circuit.

FIG. 6 shows the detailed configuration of this circuit.

Figure 7:
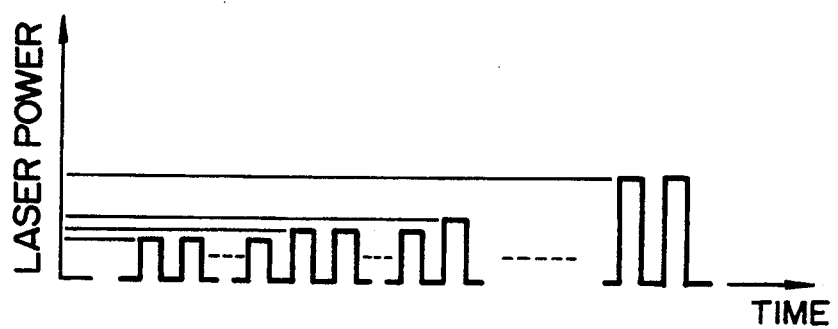
FIG. 7 is a diagram showing a test pattern for measuring a recording characteristic.

The laser power setting circuit 16 operates by using the polarity inversion interval signal 14 as a reference pulse. In the laser power check mode, the recording characteristic measuring test pattern (first record pattern) of FIG. 7 is recorded while the laser power is stepwise changed. Thereafter, the read-out signals thereof are checked to determine an optimal laser power. Moreover, in the recording condition check mode, the first record pattern is recorded with a predetermined laser power such that the read-out signal thereof is then checked to decide whether or not the present laser power is within a preset allowable range.

The first record pattern is constituted with a pulse sequence having a predetermined duty ratio. When the pulse sequence is associated with a minimum available edge interval, the optimal laser power can be detected with high precision.

A latch circuit 706 and a subtractor circuit 709 are used to compute, in the laser power check mode, a duty ratio (a difference between a pulse length and a gap length) of a read-out signal of the first record pattern for each laser power. In the recording condition check mode, a duty ratio of a read-out signal of the first record pattern is obtained for the present laser power.

An AND circuit 702 and an OR circuit 703 are employed to specify a period of time for the operation of the laser power setting circuit 16 (in the laser power and recording condition check modes).

A delay line 710, a counter circuit 704, and a decoder 711 are utilized to detect a point of time when the laser power is stepwise altered in the laser power check mode so as to produce a pulse at the timing. A counter circuit 705 counts the pulses to determine the strength (with a sequential number assigned in a strength order) of the laser power signal being used.

A flip flop 707 judges a signal representing a sign bit of the subtractor circuit 709 to determine whether or not the laser power used to record the read-out signal being processed is higher than the optimal laser power. Since the first record pattern is recorded as shown in FIG. 7 with a laser power stepwise increased, the polarity of the output signal from the flip flop circuit 707 is inverted for the first time when the optimal laser power is exceeded by the laser power used to record the read-out signal being processed. In consequence, the output from the counter circuit 705 at this point of time denotes the strength (with a sequence number in the power strength order) of the optimal laser power.

Subtractor circuits 714 and 715, an AND circuit 716, and a flip flop 708 operate in the recording condition check mode to output a signal designating whether or not the current laser power is within the preset allowable range suitable for the data recording operation.

The subtractor circuits 714 and 715 respectively have input lines 717 and 718, which are respectively applied with the upper-limit and lower-limit values of the allowable range.

Edge Interval Judge Circuit 17

Figure 8:
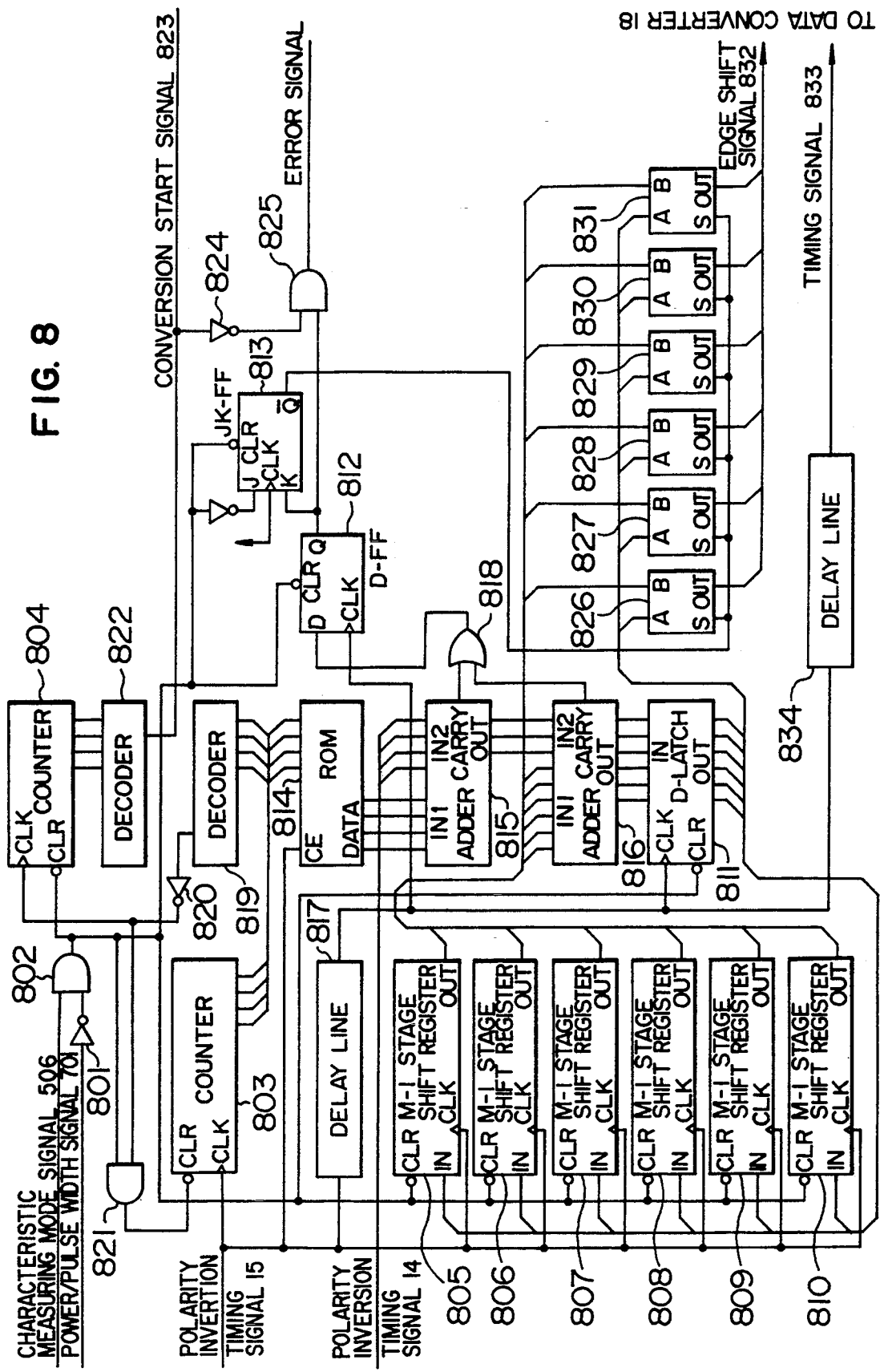
FIG. 8 is a diagram showing in detail an edge interval judge circuit.

FIG. 8 shows details of the structure of this circuit.

The edge interval judge circuit 17 achieves computations, based on a read-out signal of a predetermined second record pattern including a combination of pulses of various lengths and a gap, to attain a shift quantity of each edge of a read-out signal related to the record signal, thereby producing data to be used to form the pulse width adjusting table 19.

In this embodiment, the second record pattern is recorded N times (N is an integer) to obtain thereafter read-out signals thereof. The obtained signals are classified into third patterns each having a shorter length, the third pattern comprising three consecutive pulses and gaps. The shift quantity of the last edge portion of each of the third patterns is processed to obtain a mean shift quantity.

The number of pulses of the inputted polarity inversion timing signal 15 is counted by a group of circuits including a counter circuit 803, a decoder circuit 819, a NOT circuit 820, and an AND circuit 821 to detect the sequential number (relative to the first read-out signal) assigned to the read-out signal of which the edge is being processed. The count value is delivered as an address signal to ROM circuit 814. At this moment, when the edge shift quantity is zero, there is produced a value obtained by inverting the sign of the value represented by the polarity inversion interval signal 14.

That is, assuming that the length of an i-th pulse and that of a gap of a predetermined record pattern are respectively represented as $l_i$ and $b_i$, when an address i is inputted to the ROM circuit 814, the following output signal is generated.

$$-\{(l_1 - b_2) + (l_3 - b_4) + \ldots + (l_{i-1} - b_i)\}$$

(where, $i$ is an even number)

$$-\{(l_1 - b_2) + (l_3 - b_4) + \ldots + l_{i-1}\}$$

(where, $i$ is an odd number)

The output signal and the polarity inversion interval signal 14 are supplied to the adder circuit 815, which in turn computes an edge shift quantity for the processing at the point of time.

A latch circuit 811 and shift registers 805 to 810 are used to form a ring-type data buffer together with an adder circuit 816. For each of the third patterns, the edge shift quantities (outputs from the adder circuit 815) are accumulated to be memorized as an intermediate result.

A counter circuit 804 and a decoder circuit 822 are disposed to detect the sequential number (relative to the first period) of the period or cycle of the second record pattern under processing. When the final period is detected, the polarity of a conversion initiation signal 823 is inverted, which indicates that an output signal 832 thereafter represents a mean value of the edge shift quantities for each of the third patterns.

In this regard, the flip-flop circuits 812 and 813, the NOT circuit 824, the OR circuit 818, the AND circuit 825, and the selector circuits 826 to 831 constitute a circuit unit for detecting a data error (caused by, for example, a disk defect) during the processing. In this constitution, when an error is found in the last period of the read-out signal of the second record pattern, the accumulated results of the edge shift quantities attained for the respective third patterns up to the previous period are processed to obtain a mean value of edge shift quantities for an identical edge associated with the detected error.

Figure 9:
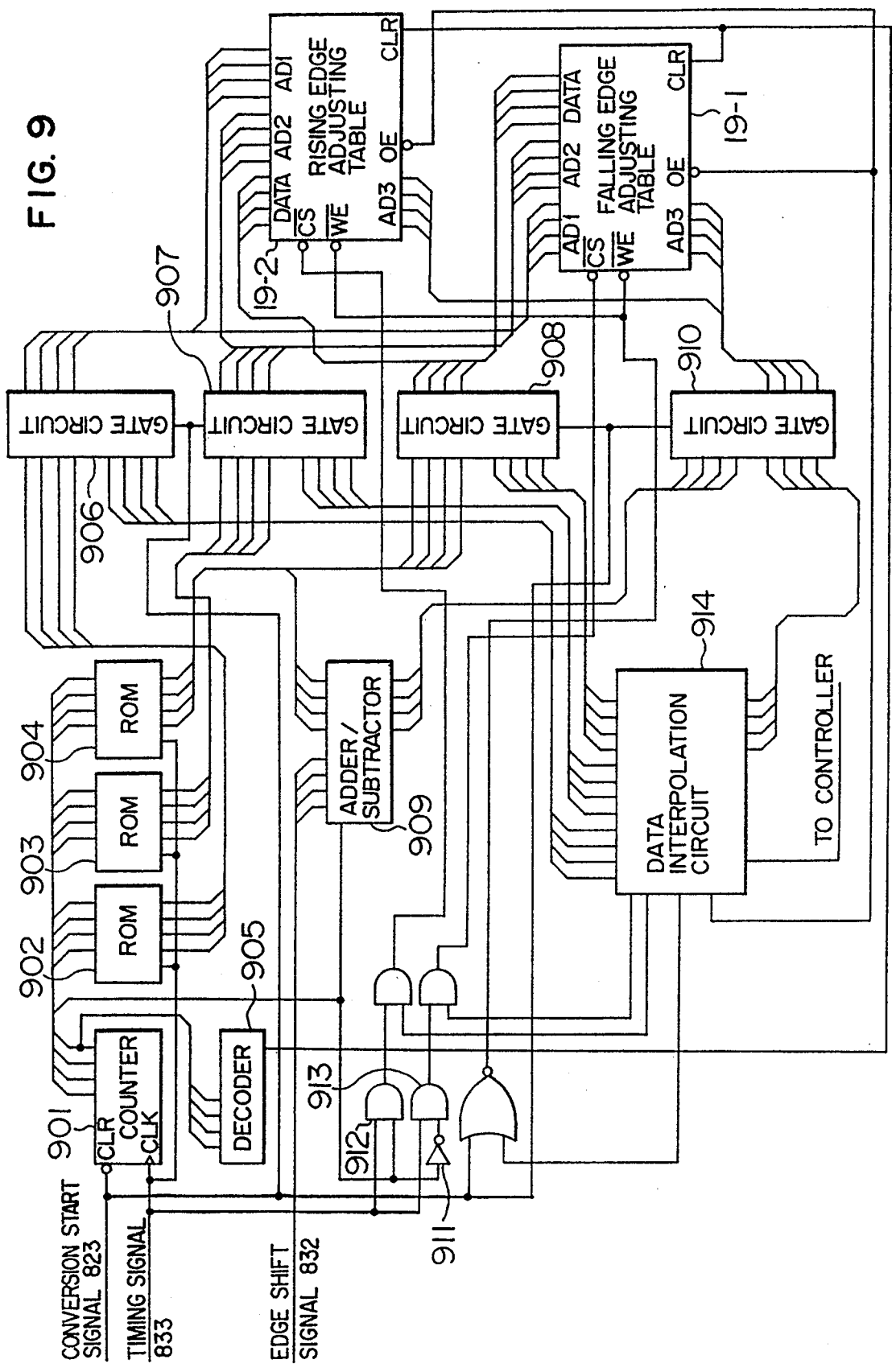
FIG. 9 is a detailed diagram showing a circuit for producing an edge width adjusting table.
Figure 10:
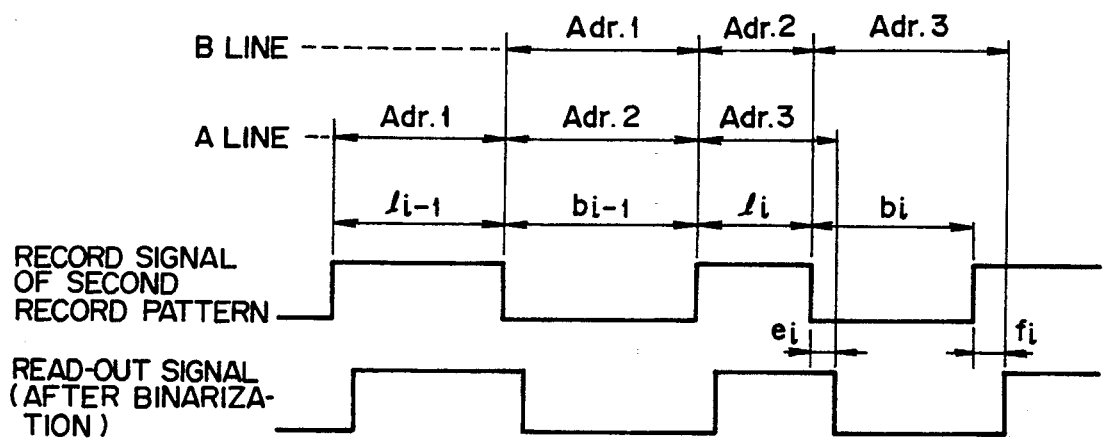
FIG. 10 is a graph showing relationships between a record signal and a read-out signal associated with patterns respectively including pulses of various lengths and gaps.

FIG. 9 shows an embodiment of the edge width adjusting table generator circuit 18, whereas FIG. 10 is a graph representing a record signal and a read-out binary signal related to a second record pattern including pulses of various lengths and gaps. The operation of the table generator circuit 18 will now be described by reference to FIGS. 9 and 10. Let us assume here that the table is subdivided into three blocks to be indicated by addresses 1, 2, and 3, respectively. In this situation, ROMs 902 and 903 are loaded with digital data values of the pulse and gap lengths respectively associated with the addresses 1 and 2 of the A line shown in FIG. 10. In the configuration of FIG. 9, the addresses 1, 2, and 3 are denoted as AD1, AD2, and AD3, respectively. In the example of FIG. 10, letters $l_{i-1}$ and $b_{i-1}$ respectively designate addresses 1 and 2. An area indicated by the address 3 is supplied from an adder/subtractor circuit 909 with the length $l_i$ of the third pulse and data $l_i + e_i$ attained as the total of edge shift signals 832 related thereto. When $e_i$ is within the range of $l_i$, the difference therebetween is computed by the adder/subtractor 909 such that the address 3 is obtained as $l_{i-e_i}$. A ROM 904 is loaded with the third pulse length or gap length, which is a data item to be written in the edge shift adjusting table. Since $e_i$ represents a falling edge shift quantity, the data is stored in a falling edge shift adjusting table 19-1.

Figure 11A:
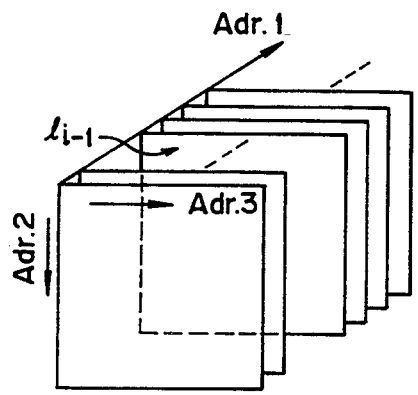
FIGS. 11A and 11B are diagrams illustratively showing a memory structure as a table.
Figure 11B:
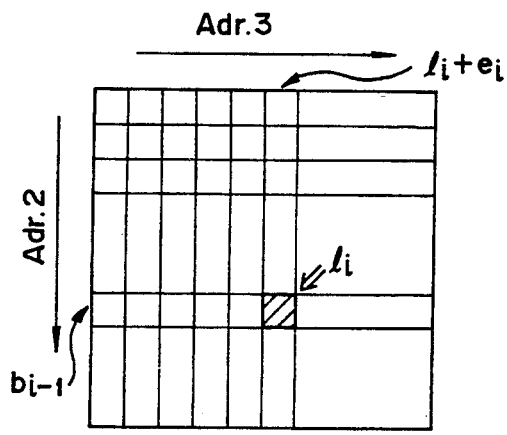

FIGS. 11A and 11B show relationships between the addresses 1 to 3 and the memory layout of the table with data loaded therein.

When the edge shift signal 832 denotes rising edge shift quantity $f_i$, the addresses 1 to 3 are respectively $b_{i-1}$, $l_i$, and $b_i + f_i$ of the B line shown in FIG. 10. Consequently, the data $b_i$ is written in a rising edge shift adjusting table 19-2. In order to appropriately treat the edge shift quantities related to combinations of various memory patterns, the respective addresses have a sufficiently high resolution in this constitution.

Each data item of these tables 19-1 and 19-2 is set to 0 in the initial stage such that a data item is stored therein for each input of the edge shift signal 832. However, for a pattern which cannot be recognized as a combination of second record patterns, the data item to be written is kept unchanged, namely, 0. With respect to data for the address at which the data have not been written as above, they are obtained through an interpolation based on data already written in the table. As a result, also at the addresses 1 to 3 of FIG. 16B, which will be described later, data items can be written in the associated areas.

Gate circuits 906 to 908 and 910 are employed in a data write operation to achieve a write data changeover operation between a measured value and an interpolated value.

Figure 12:
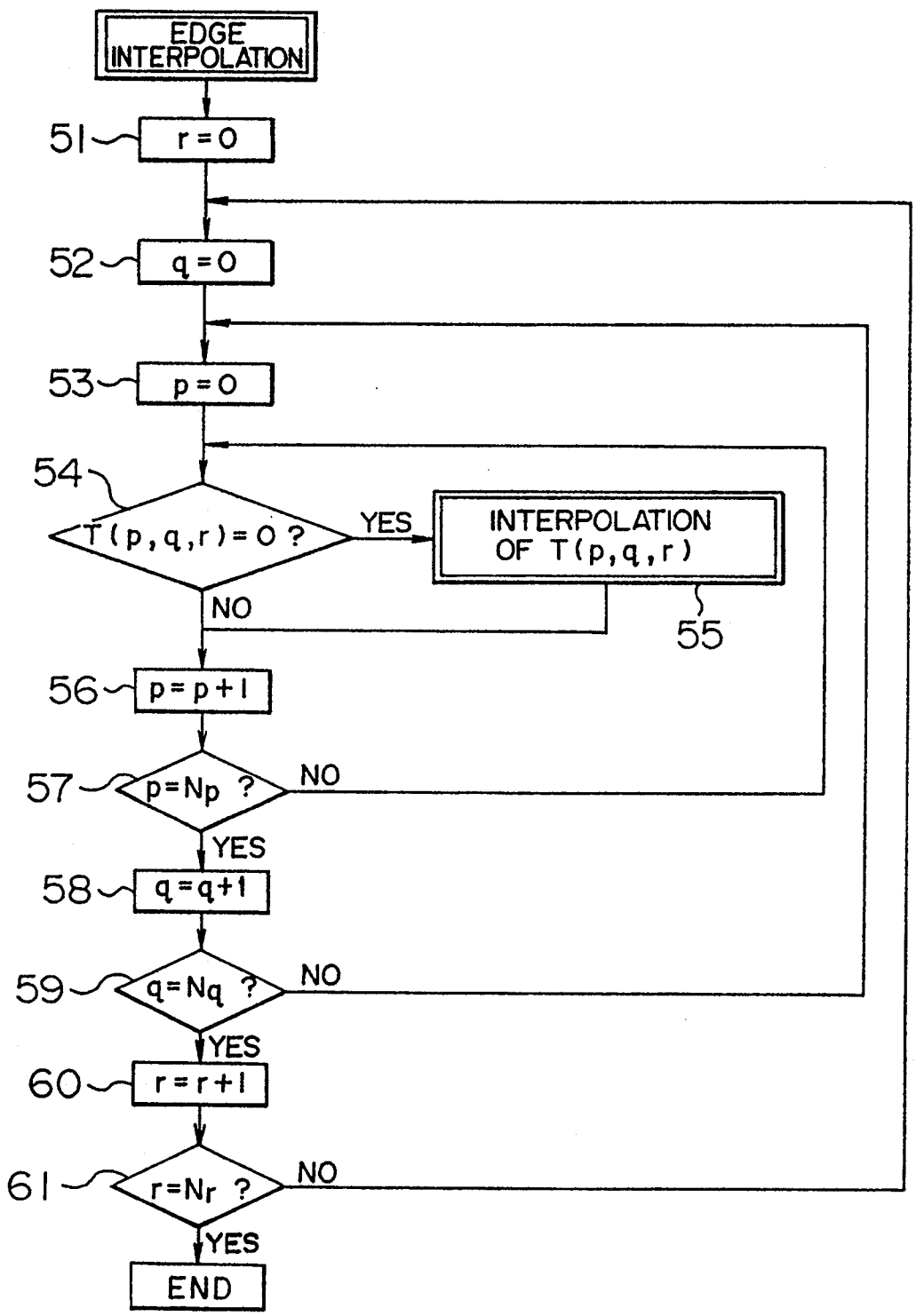
FIG. 12 is a flowchart showing an operation in which a data position necessitating an interpolation is determined.
Figure 13:
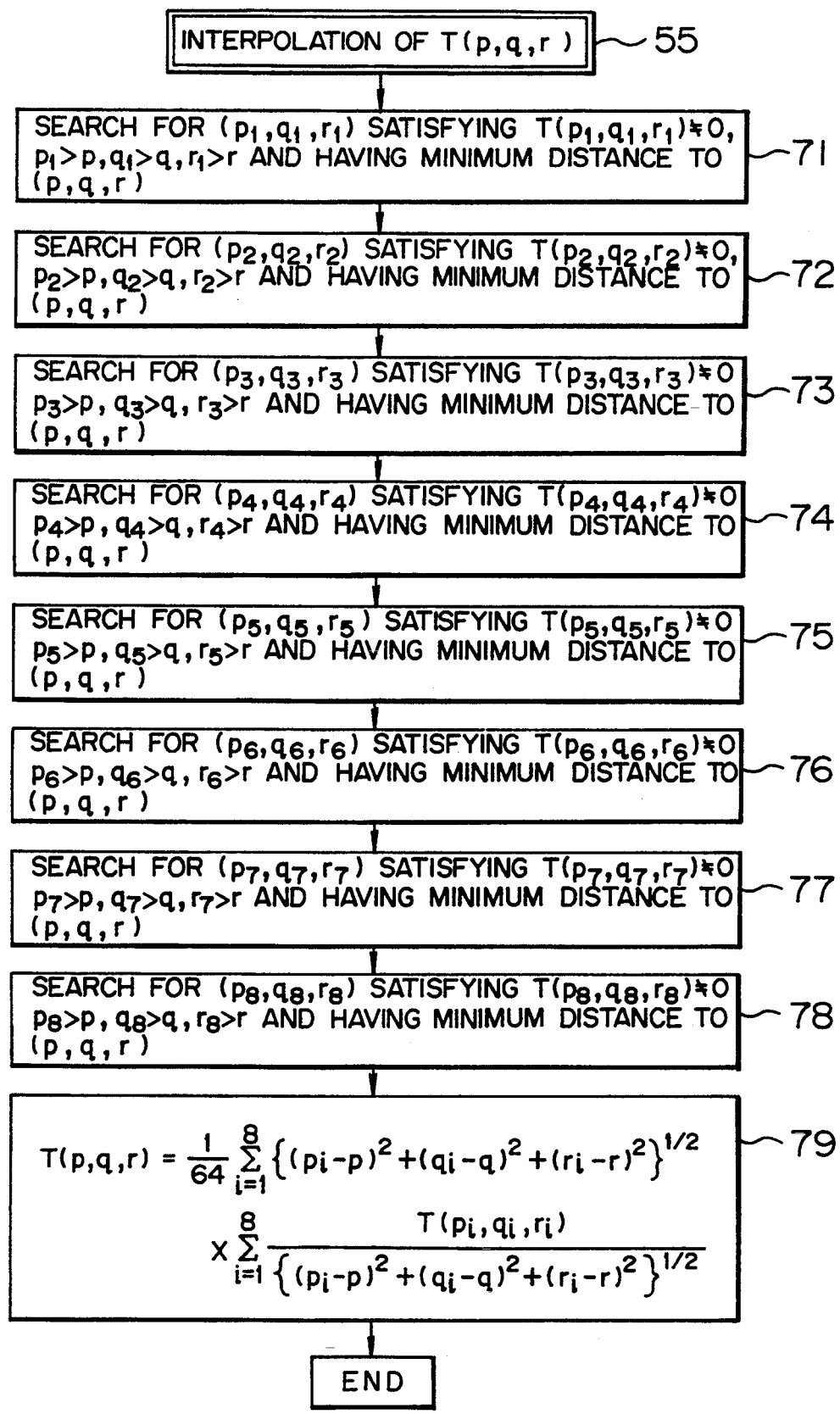
FIG. 13 is a flowchart showing the operation of the interpolation.

FIGS. 12 and 13 show flowcharts of the data interpolation. Namely, the system sequentially conducts a data scanning operation along the respective address directions. For data having a value 0, a data search is conducted in the three-dimensional memory space along the eight directions thereof to obtain measured data at a position next to a position 0 for each direction. Subsequently, each measured datum is assigned with a weight depending on a distance thereof from the position of the data having a value 0 so as to compute a mean value thereof. The obtained value is used as an interpolation value at the position of the data having the value 0.

Specifically, let us assume that the dimensions of the edge adjusting table T (AD1, AD2, AD3) are expressed as Np, Nq, and Nr in the respective directions AD1, AD2, and AD3; the pulse/gap lengths ($l_{i-1}$, $b_{i-1}$, $l_i$) respectively have resolutions $\Delta\alpha$, $\Delta\beta$, and $\Delta\gamma$; and the pulse/gap lengths ($l_{i-1}$, $b_{i-1}$, $l_i$) respectively take the minimum values $\alpha_0$, $\beta_0$, and $\gamma_0$. Under this condition, a combination of patterns ($l_{i-1}$, $b_{i-1}$, $l_i$) registered to the edge adjusting table is expressed as follows.

$$(l_{i-1}, b_{i-1}, l_i) = (\alpha_0 + p\Delta\alpha_0, \beta_0 + q\Delta\beta_0, \gamma_0 + r\Delta\gamma_0)$$

$$(0 \leq p \leq Np, 0 \leq q \leq Nq, 0 \leq r \leq Nr)$$

In consequence, when the table scanning operation is achieved, a set of data items (p, q, r) is inputted as an address value. In the flowchart of FIG. 12, steps 51, 52, and 53 initialize the respective addresses. A step 54 checks to determine whether or not data at an objective address position has a value 0. If this is the case, to obtain data for the area based on an interpolation, control is passed to a step 55. Otherwise, since the pertinent data have already been obtained as measured data, a data check is conducted in the next address position. Steps 56 and 57, 58 and 59, and 60 and 61 respectively check data in the directions of the addresses 1, 2, and 3.

FIG. 13 is a flowchart showing the operation of the interpolation.

A step 71 achieves a data search in the first direction of the eight directions to obtain measured data at a position next to the position (p, q, r) of data having a value 0.

A step 72 similarly conducts a data search in the second direction to obtain measured data at a position next to the position (p, q, r) of data having a value 0.

In steps 73 to 78, the data search operations are conducted in a similar manner to obtain measured data at the nearest positions in the respective directions as above.

A step 78 assigns the obtained data with weights inversely proportional to the respective distances relative to the position (p, q, r). Eight resultant measured data items are then processed to obtain a mean value, which is employed as interpolation data.

Figure 14:
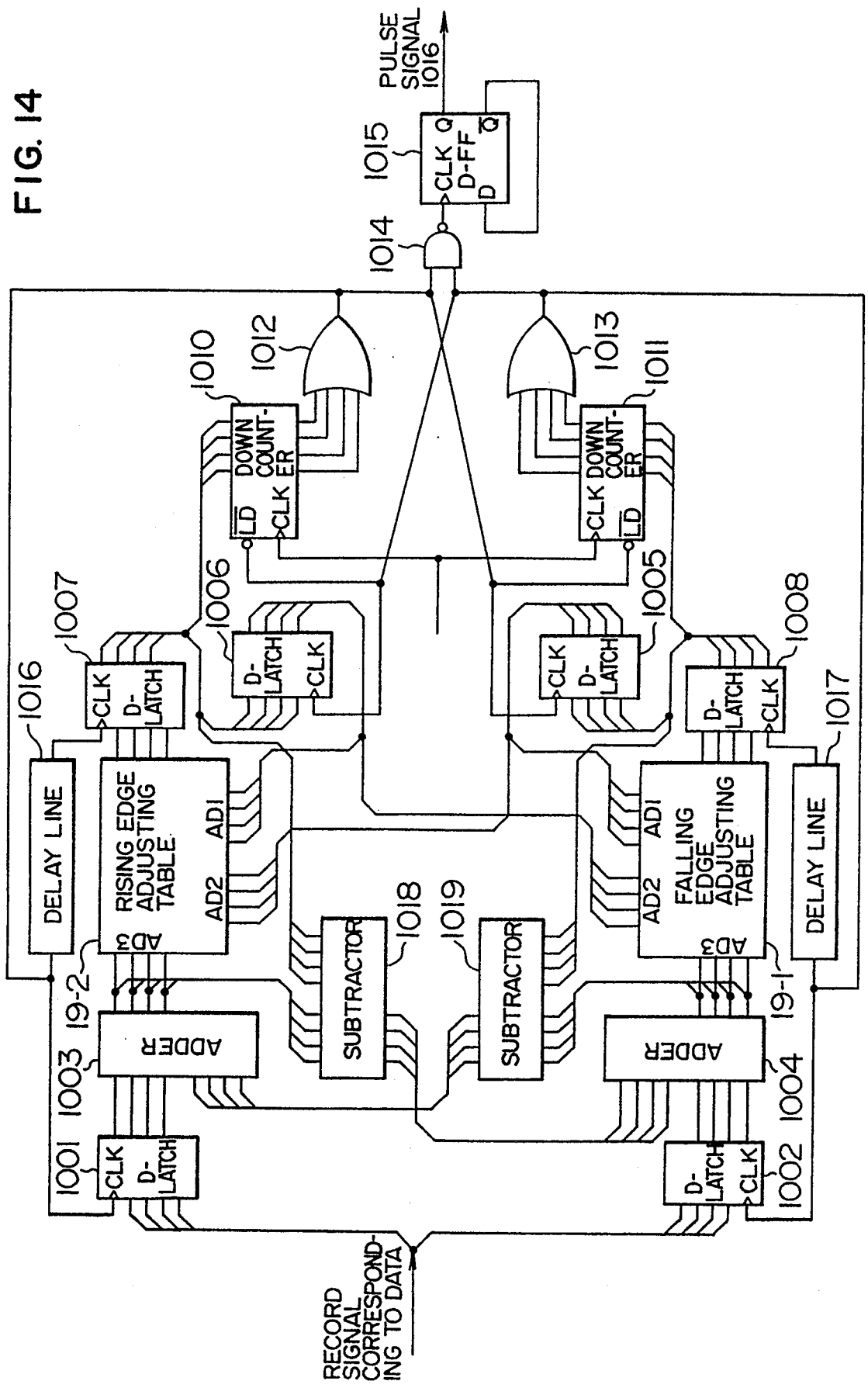
FIG. 14 is a diagram showing in detail an edge width adjusting circuit.
Figure 15:
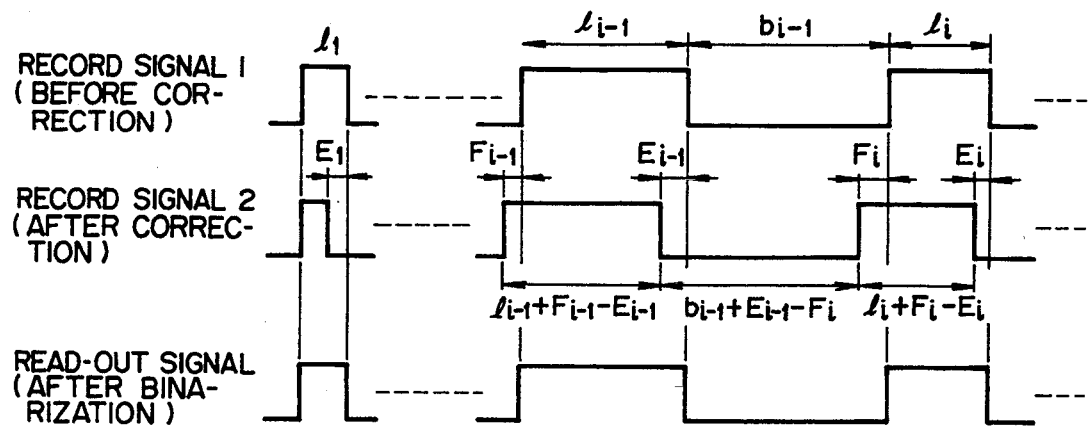
FIG. 15 is a graph showing an example of a correction in an actual data recording operation.

FIG. 14 shows an embodiment of the edge width adjusting circuit 21, whereas FIG. 15 shows an example of the correction in an actual data recording operation.

Figure 16A:
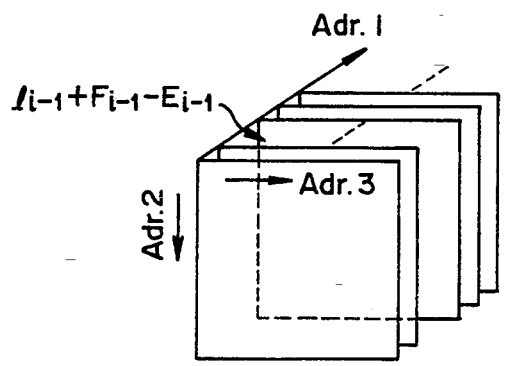
FIGS. 16A and 16B are diagrams showing an example of an operation in which correction data are obtained from the table.
Figure 16B:
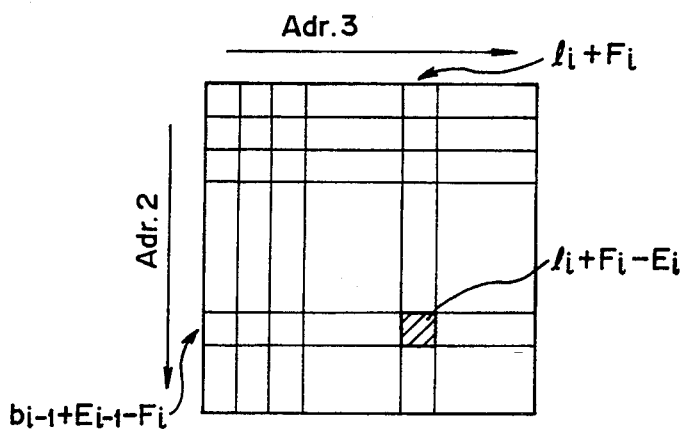

FIGS. 16A and 16B are diagrams useful to explain an operation example in which correction data is read from the table.

Referring now to FIGS. 15, 16A, and 16B, the operation of the edge width adjusting circuit 21 will be described.

In the constitution of FIG. 14, a latch circuit 1005 is used to set addresses 1 and 2 in association with the falling edge adjusting table 19-1 and the rising edge adjusting table 19-2, respectively. A latch circuit 1006 establishes addresses 2 and 1 for the edge adjusting tables 19-1 and 19-2, respectively. Each of adders 1003 and 1004 produces an output, which is used to set an address 3. Based on the value set as the address 3, a subtractor 1018 outputs a value equivalent to a rising edge shift quantity; whereas a subtractor 1018 similarly produces a value associated with a falling edge shift quantity. A latch circuit 1001 is disposed to store therein a value related to a gap length of a record pulse 1 shown in FIG. 15. A latch 1002 is employed to be loaded with a value equivalent to a pulse length of the record pulse 1. Down counters 1010 and 1011 and gate circuits 1012 and 1013 are used to convert a digital value into a pulse and a gap each having an associated length. The pulse and the gap that undergo the correction are outputted in the form of a pulse signal 1016.

When the first pulse $l_i$ of the record pulse 1 before correction is inputted, the system conducts processing as follows. Namely, since this is equivalent to a case where a pulse is recorded for the first time after a long interval of time, the pulse $l_1$ may be considered to have been received after a pulse of a small length followed by a gap having a great length. In this situation, the falling edge of the pulse is corrected by referencing the falling edge adjusting table 19-1. First, the latches 1005 and 1006 are loaded with the minimum number of the address 1 and the maximum number of the address 2, respectively. Moreover, the output from the subtractor 1018 is set to 0. With this initialization, the latch 1002 and the adder 1004 each produce an identical output i.e. $l_1$. When a read operation is achieved on the table 19-1 in this state, since the value associated with Fi of the address 3 of FIG. 16B is beforehand set to 0 by the subtractor 1018, a pulse length $l_1 - E_1$ is obtained as the corrected pulse length.

When the first gap is inputted after the first pulse of the record pulse 1, the rising edge adjusting table 19-2 is referenced to correct the rising edge of the gap. In this case, the latch 1006 to be loaded with the address 1 of the table 19-2 is set to the maximum number of the address 1, the latch 1005 to be loaded with the address 2 is set to $l_1 - E_1$, and then the falling edge correction quantity $E_1$ of the previous pulse, which is a portion of a value to be used as the address 3, is set to the subtractor 1019. When a read operation is conducted on the table 19-2 under this condition, $b_1 + E_1 - F_1$ is attained as the corrected gap length.

When the second pulse of the record pulse 1 is inputted, the falling edge adjusting table 19-1 is again referenced to accomplish the correction. Namely, the addresses 1, 2 and 3 are respectively set to the corrected pulse length $l_1 - E_1$, the corrected gap length $b_1 + E_1 - F_1$, and $l_2 + F_2$. Resultantly, the corrected pulse length is obtained as $l_2 + F_2 - E_2$.

FIG. 15 shows an example of the correction in a generalized form. Assuming for three patterns as collation units that the rising and falling edge correction quantities of the pulse and the gap are $F_{i-1}$, $E_{i-1}$, and $F_i$, respectively obtain the corrected length of the third pulse of the collation pattern, the addresses 1 and 2 are respectively set to the corrected pulse and gap lengths and the address 3 is set to the third record pulse length $l_i + F_i$ obtained by use of the preceding edge correction quantity as above. As a result, the corrected third pulse length is obtained as $l_i + F_i - E_i$.

The corrected gap length can also be obtained in a similar manner.

Figure 17:
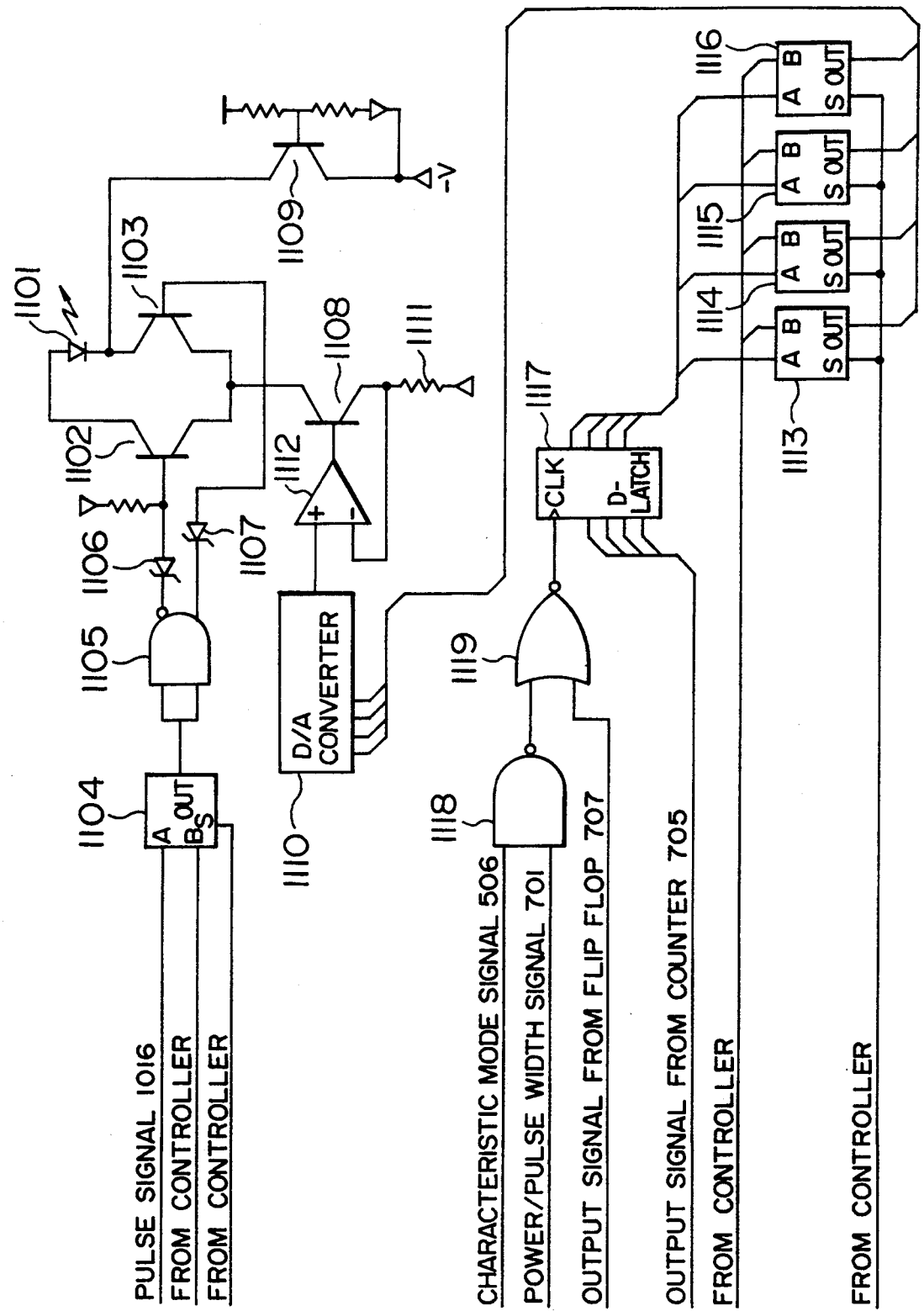
FIG. 17 is a detailed circuit diagram showing a laser driver circuit.

FIG. 17 shows an embodiment of the laser driver circuit 12.

This embodiment is implemented by additionally disposing a recording power change function to the conventional laser driver circuit. Each A input terminal of selector circuits 1113 to 1116 is supplied with a laser power preset value for an ordinary recording operation, whereas each B input terminal thereof is supplied with a laser power preset value to be used when the characteristic measuring test pattern of FIG. 7 is recorded in the recording power check mode.

For the laser power of an ordinary recording operation, a numeric value designating a level determined to be an optimal laser power in the recording power check mode is retained in a latch circuit 1117. In operation, the signal is continuously applied to the selectors 1113 to 1116.

An S terminal of each of the selectors 1113 to 1116 is supplied with a select signal from the controller such that the output therefrom is changed over as follows. Namely, in the recording power check mode, an Out terminal thereof outputs a signal received from the B terminal, whereas in the other modes, the Out terminal delivers a signal from the A terminal.

Each selector output is fed to a D/A converter 1110. Based on a level of an output signal produced by the D/A converter 1110, the laser power is decided for the recording operation.

In the description of the embodiments according to the present invention, the collation patterns have three edge widths; however, naturally, the correction can be similarly accomplished when collation patterns having other than three edges are employed.

We claim:

1. A record signal correcting method for use in an optical recording/read-out apparatus wherein record signals are recorded that have a mark length bound by opposite edges and having an edge width extending therebetween, comprising the steps of:

(a) recording N times, where N is an integer, a sequential record pattern B or record signals including a plurality of patterns A each having an n edge width, where n is an integer, and respectively being recorded in various combinations of said n edge widths;

(b) reading out said pattern B as a signal thus recorded;

(c) classifying the read-out signal into one of said patterns A and obtaining, for each edge position of each said pattern A, a shift quantity associated with said edge position relative to an edge position indicating an ideal edge recording position thereof;

(d) generating and storing a table containing relationships between said shift quantities and said patterns A;

(e) collating, for a data recording operation, a record signal of said data being recorded and having a pattern of the n edge widths with the patterns stored in said table to obtain a match; and (f) independently correcting head and tail edge shifts for each of said patterns A by a corresponding one of said shift quantities retrieved from said table responsive to the match resulting from said collating.

2. A record signal correcting method according to claim 1 wherein said table generating step further includes a step of interpolating edge position data based on the edge shift quantity of said pattern A, thereby attaining an edge shift quantity of a pattern D having edge widths not being classified into one of said patterns A.

3. A record signal correcting method according to claim 2 wherein said table generating step further includes a step of creating a table containing relationships between said patterns A and shift quantities of a last edge for each of said patterns A.

4. A record signal correcting method according to claim 1 wherein said recording step includes the steps of:

recording a predetermined pattern C or record signals while changing a laser power for a recording operation in a stepwise manner;

comparing a pulse length of a record signal of said pattern C with a corresponding pulse length of a read-out signal of said pattern C; and selecting as a laser power for use in the recording of said pattern B, based on a result of said comparison, a laser power used to record a pulse of which a difference between said pulse lengths is within an allowable range.

5. A record signal correcting method according to claim 4 wherein said recording step includes the steps of:

recording said predetermined pattern C with a predetermined laser power;

comparing a pulse length of the read-out signal of said pattern C with a pulse length of a record signal corresponding thereto;

selecting, when a difference between said pulse lengths is within an allowable range as a result of said comparison, said predetermined laser power as a laser power for use in the recording of said pattern B; and recording, when the difference between said pulse lengths is beyond the allowable range as a result of said comparison, said pattern C while changing said predetermined laser power in a stepwise manner.

6. A record signal correcting method according to claim 5 wherein said pulse length comparing step includes a step of checking a duty ratio between a pulse length and a gap length of said read-out signal.

7. A record signal correcting method according to claim 3 wherein said table producing step includes the steps of:

assigning digital values to a portion of addresses of a memory and data and further assigning the digital values to be associated with lengths respectively of the pulses and gaps constituting said patterns A of said read-out signal;

assigning to remaining addresses of said memory a digital value corresponding to a shift quantity of the last edge of said patterns A; and writing said assigned data in the memory at a memory position specified by said assigned address.

8. A record signal correcting method according to claim 7 wherein said interpolating step includes the steps of:

obtaining, for a zero data position in a memory space in which measured data of an edge shift quantity cannot be attained, said measured data for positions in said memory space nearest to said zero data position in a plurality of data address directions; and assigning weights to said plurality of measured data depending on distances respectively from said zero data position to obtain a mean value thereof, and thereafter setting the mean value as data of said zero data position.

9. A record signal correcting method according to claim 8 wherein said correcting step includes the steps of:

reading data from the memory based on a memory address represented by digital values respectively corresponding to the matched pulse and gap lengths; and correcting, based on said data thus read from the memory, an interval of a last edge of said collated record signal.

10. A record signal correcting apparatus for use in an optical recording/read-out apparatus wherein record signals are recorded that have a mark length bound by opposite edges and having an edge width extending therebetween, comprising:

(a) means for recording on an optical disk N times, where N is an integer, a record pattern sequence B of record signals including a plurality of patterns A each having an n edge width, where n is an integer, and respectively being recorded in various combinations of said n edge widths;

(b) means for reading out said recorded pattern B as a signal from the optical disk;

(c) means for classifying the read-out signal into one of said patterns A and for obtaining for each edge position of each said pattern A, a shift quantity associated with said edge position relative to an edge position indicating an ideal recording position thereof;

(d) means for generating and storing therein a table containing relationships between said shift quantities and said patterns A;

(e) means for collating a record signal of data being recorded and having a pattern of the n edge widths with the patterns stored in said table to obtain a match; and (f) means for independently correcting head and tail edge shifts for each of said patterns A by a corresponding one of said shift quantities retrieved from said table responsive to the match resulting from said collating.

11. A record signal correcting apparatus according to claim 10 wherein said shift quantity obtaining means includes:

means for interpolating edge position data based on the edge shift quantity of said pattern A, thereby attaining an edge shift quantity of a pattern D having n edge widths and not being classified into said pattern A; and means for writing the value thus obtained through said interpolation as data in said table.

12. A record signal correcting apparatus according to claim 11 wherein said shift quantity obtaining means includes means for attaining a shift quantity of a last edge of said pattern A.

13. A record signal correcting apparatus according to claim 9 wherein said record means includes:

means for changing the laser power in a stepwise manner when a predetermined pattern C is recorded;

means for comparing a pulse length of a read-out signal of said pattern C with a corresponding pulse length of a record signal of said pattern C; and means for selecting a laser power used to record a pulse concerning which a difference between said pulse lengths is within an allowable range as a laser power for use in the recording of said pattern B, based on a result of said comparison.

14. A record signal correcting apparatus according to claim 13 wherein said record means includes:

means for comparing a pulse length of the read-out signal of said pattern C recorded with a predetermined laser power with a pulse length of a record signal corresponding thereto;

means for selecting, when a difference between said pulse lengths is within an allowable range as a result of said comparison, said predetermined laser power as a laser power for use in the recording of said pattern B; and means for recording, when the difference between said pulse lengths is beyond the allowable range as a result of said comparison, said pattern C while changing said predetermined laser power in a stepwise manner.

15. A record signal correcting apparatus according to claim 14 wherein said pulse length comparing means includes means for checking a duty ratio between a pulse length and a gap length of said read-out signal.

16. A record signal correcting apparatus according to claim 11 wherein said table storing means includes:

means for assigning digital values to a portion of addresses of a memory and data, the digital values being respectively associated with lengths respectively of the pulses and gaps constituting said pattern A of said read-out signal;

means for assigning to remaining addresses of said memory a digital value corresponding to a shift quantity of the last edge of said pattern A; and means for writing said assigned data in the memory at a memory position specified by said assigned address.

17. A record signal correcting apparatus according to claim 16 wherein said shift quantity obtaining means includes:

means for obtaining, for a 0 data position in a memory space in which measured data of an edge shift quantity cannot be attained, said measured data for positions nearest to said 0 data position in a plurality of directions; and means for assigning weights to said plurality of measured data depending on distances respectively from said 0 data position to obtain a mean value thereof, thereby writing the mean value as data of said 0 data position.

18. A record signal correcting apparatus according to claim 17 wherein said correcting means includes:

means for reading data from the memory based on a memory address represented by digital values respectively corresponding to the matched pulse and gap lengths; and means for correcting, based on said data thus read from the memory, an interval of a last edge of said collated record signal.

* * * * *